United States Patent
Lee et al.

(10) Patent No.: US 8,786,144 B2
(45) Date of Patent: Jul. 22, 2014

(54) LINEAR VIBRATION MOTOR

(75) Inventors: Kwang Hyung Lee, Gyunggi-do (KR); An Soo Yoon, Gyunggi-do (KR); Hwa Young Oh, Seoul (KR)

(73) Assignee: Samsung Electro-Mechanics Co., Ltd, Gyunggi-Do (KR)

( * ) Notice: Subject to any disclaimer, the term of this patent is extended or adjusted under 35 U.S.C. 154(b) by 517 days.

(21) Appl. No.: 13/099,233

(22) Filed: May 2, 2011

(65) Prior Publication Data
US 2012/0169150 A1 Jul. 5, 2012

(30) Foreign Application Priority Data
Dec. 31, 2010 (KR) .......................... 10-2010-0139975

(51) Int. Cl.
*H02K 33/18* (2006.01)
*B06B 1/04* (2006.01)

(52) U.S. Cl.
CPC ................ *H02K 33/18* (2013.01); *B06B 1/045* (2013.01)
USPC .......................................................... 310/25

(58) Field of Classification Search
USPC .................. 310/14–15, 17, 25–26; 340/384.1, 340/388.1, 407.1
See application file for complete search history.

(56) References Cited

U.S. PATENT DOCUMENTS

| 5,184,037 A | * | 2/1993 | Kobayashi et al. | ............. 310/26 |
| 6,542,381 B1 | * | 4/2003 | Sei et al. | ........................ 361/801 |
| 2008/0182435 A1 | * | 7/2008 | Ho et al. | ......................... 439/77 |

FOREIGN PATENT DOCUMENTS

| CN | 102468736 A | 5/2012 |
| CN | 102545529 A | 7/2012 |
| KR | 10-0923867 | * 10/2009 | ...................... 310/25 |

OTHER PUBLICATIONS

Office Action dated Dec. 4, 2013 from corresponding Chinese Patent Application No. 201110126124.0 and its English summary provided by the Applicant's foreign counsel.

* cited by examiner

*Primary Examiner* — Tran Nguyen
(74) *Attorney, Agent, or Firm* — Ladas & Parry, LLP

(57) ABSTRACT

Disclosed herein is a linear vibration motor including: a fixing part including a magnet; and a vibrator part including a coil corresponding to the magnet and a printed circuit board coupled with the coil, wherein one end of the printed circuit board is coupled with the fixing part and the other end thereof is coupled with the coil.

12 Claims, 3 Drawing Sheets

LINEAR VIBRATION MOTOR

CROSS REFERENCE TO RELATED APPLICATION

This application claims the benefit of Korean Patent Application No. 10-2010-0139975, filed on Dec. 31, 2010, entitled "Linear Vibration Motor" which is hereby incorporated by reference in its entirety into this application.

BACKGROUND OF THE INVENTION

1. Technical Field

The present invention relates to a linear vibration motor.

2. Description of the Related Art

A general vibration motor, which is a component that uses a principle of generating electromagnetic force and converts electrical energy into mechanical vibrations, is mounted in mobile communication terminals, portable terminals, or the like, to silently notify a call to a user.

Recently, a linear vibration motor has been generally used as a vibration motor. The linear vibration motor is generally disposed at a corner portion of a device to generate vibrations in a direction vertical to an object receiving vibrations.

As shown in FIG. 1, the linear vibration motor may be configured to include a fixing part 10, a vibrator part 20, and an elastic member 25 coupled with the fixing part 10 to elastically support the vibrator part 20.

Further, the fixing part 10 may be configured to include a bracket 11, a coil 12, a printed circuit board 13, and a case 14 and the vibrator part 20 may be configured to include a yoke 21, a weight body 22, a magnet 23, and a plate yoke 24.

The linear vibration motor may be generally changed according to a design, but has a dimension of about 10 mm in outer diameter and 4 mm in thickness.

However, the linear vibration motor designed to be vibrated in a vertical direction has a limitation in thickness in that it is not linearly vibrated until a space of about 4 mm in thickness in which the weight body installed in the vibrator may move up and down in order to generate vibrations.

Further, in order to increase vibration volume, increasing the thickness of the linear vibration motor restricts the space where the components can be mounted in the device.

SUMMARY OF THE INVENTION

The present invention has been made in an effort to provide a linear vibrator motor including a printed circuit board coupled with a vibrator part and linearly vibrating.

According to a preferred embodiment of the present invention, there is provided a linear vibration motor, including: a fixing part including a magnet; and a vibrator part including a coil corresponding to the magnet and a printed circuit board coupled with the coil, wherein one end of the printed circuit board is coupled with the fixing part and the other end thereof is coupled with the coil and is provided with a through hole through which the magnet penetrates so as not to contact the magnet.

The printed circuit board may include: a coupling plate fixedly coupled with the fixing part; an elastic part extending from the coupling plate to provide an elastic force and extending in a spiral direction so that the through hole is formed to be larger than an outer diameter of the magnet; and a contact part provided at one end of the elastic part and coupled with the coil of the vibrator part to apply external power to the coil.

The contact part may be a ring-shaped disc part and an inner diameter of the contact part may be formed to be larger than the outer diameter of the magnet to receive the magnet therein so as not to contact the magnet.

The fixing part may include: a bracket fixedly coupled with a coupling plate of the printed circuit board; a case formed with an inner space to cover the vibrator part and coupled with the bracket; a first magnet coupled with the inner top surface of the bracket; and a second magnet coupled with the inner top surface of the case to be opposite to the first magnet.

The fixing part may further include a plate yoke that is selectively positioned at the first magnet and the second magnet.

The bracket may include a coupling plate corresponding to the coupling part of the printed circuit board.

The coupling part of the bracket may include a coupling protrusion fixedly coupled with the coupling plate of the printed circuit board and the coupling plate may be provided with the coupling groove corresponding to the coupling protrusion.

The vibrator part may include: a weight body coupled with the coil; a cylindrical yoke coupled with the weight body to increase the magnetic force of the magnet; and an elastic member of which one end is coupled with the top portion of the cylindrical yoke and the other end is coupled with the fixing part to elastically support the linear vibration motion of the vibrator part.

The weight body may be provided with a hollow part receiving the cylindrical yoke and the coil.

The elastic member may be provided with the hollow part corresponding to the second magnet to be inserted with the second magnet to elastically support the linear vibration motion of the vibrator part.

The vibrator part may further include a damper coupled with the contact part of the printed circuit board to be opposite to the fixing part in order to prevent noise and impact when contacting with the fixing part.

The damper may be provided with the hollow part corresponding to the first magnet to be inserted with the first magnet according to the linear vibration motion of the vibrator part.

The printed circuit board may be an FPC made of an elastic material.

DESCRIPTION OF THE PREFERRED EMBODIMENTS

Figure 1:
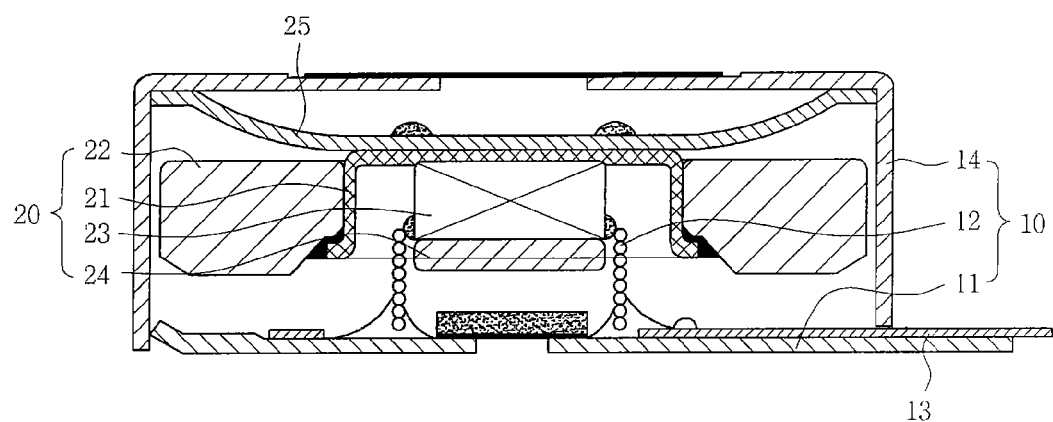
FIG. 1 is a schematic cross-sectional view of a linear vibration motor according to the prior art.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. Terms used in the specification, 'first', 'second', etc. can be used to describe various components, but the components are not to be construed as being limited to the terms. The terms are only used to differentiate one component from other components. Further, in describing the present invention, a detailed description of related known functions or configurations will be omitted so as not to obscure the subject of the present invention. Further, when it is determined that the detailed description of the known art related to the present invention may obscure the gist of the present invention, the detailed description will be omitted.

Hereinafter, the preferred embodiments of the present invention will be described in detail with reference to the accompanying drawings.

Figure 2:
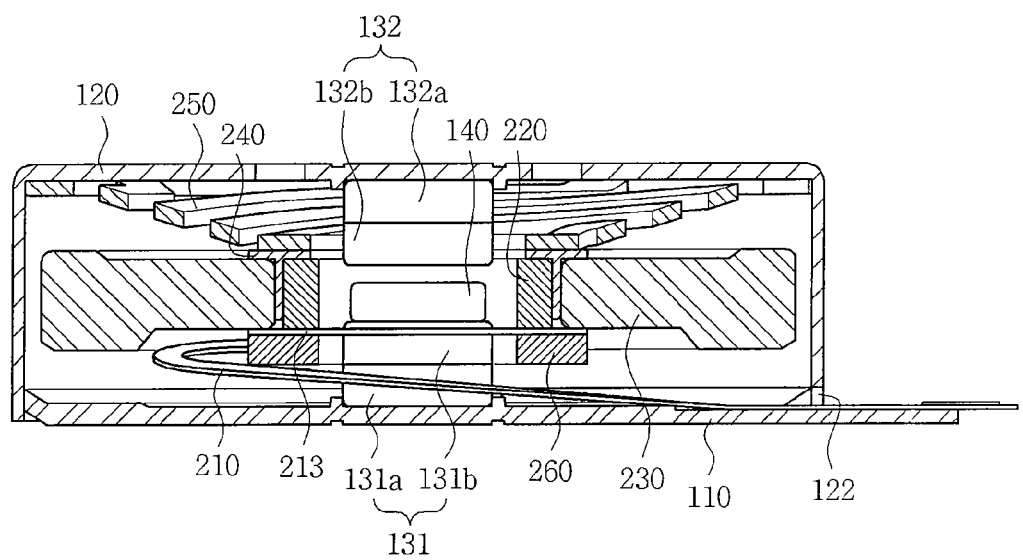
FIG. 2 is a schematic cross-sectional view of a linear vibration motor according to the preferred embodiment of the present invention.
Figure 3:
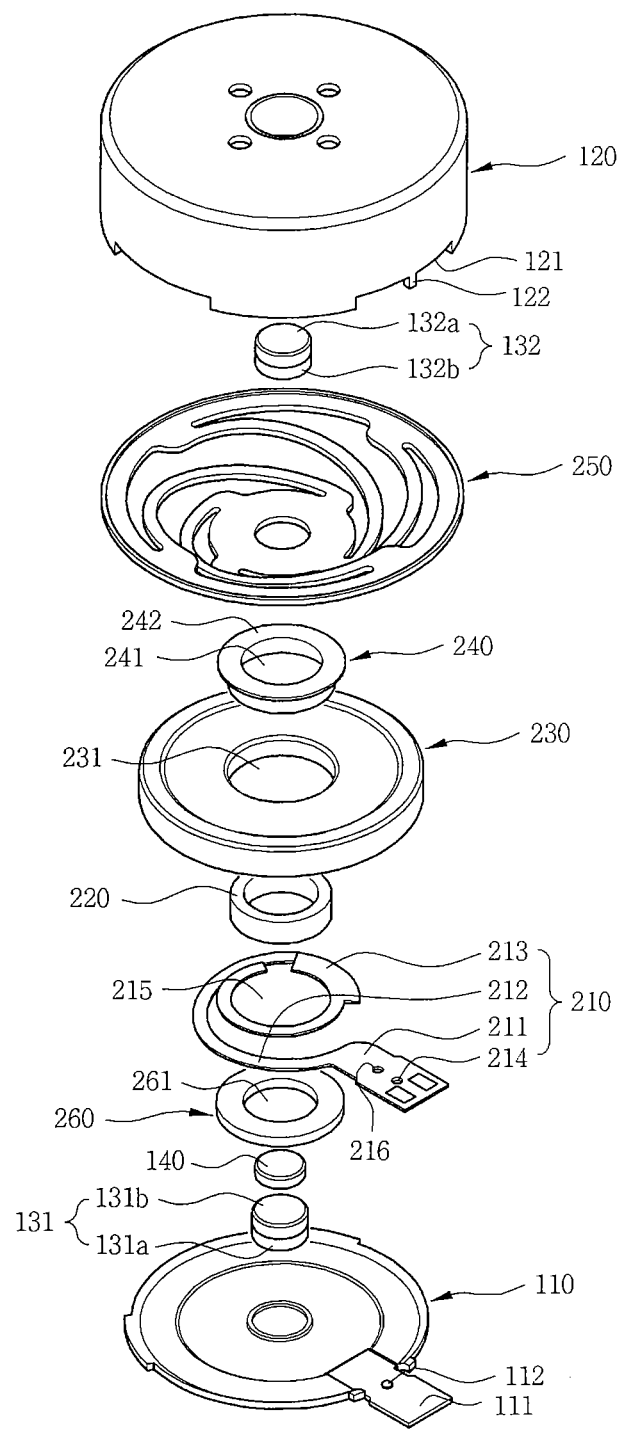
FIG. 3 is a schematic exploded perspective view of the linear vibration motor shown in FIG. 2.
Figure 4:
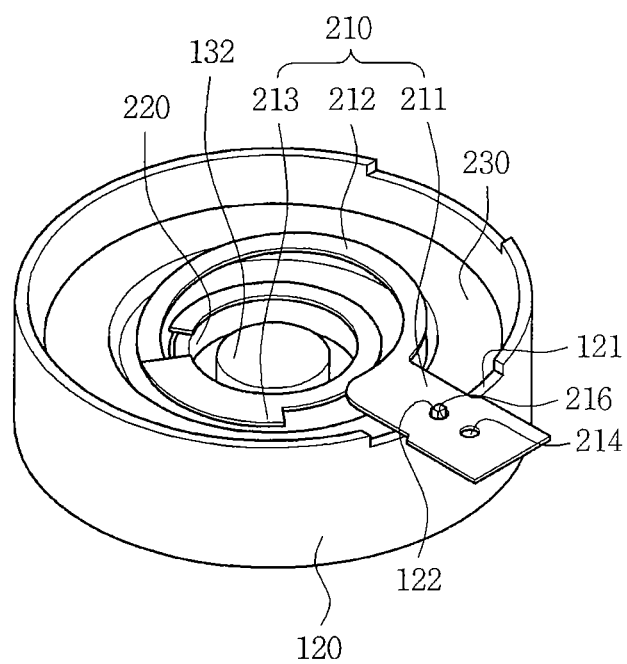
FIG. 4 is a schematic bottom view of a linear vibration motor shown in FIG. 2.

FIG. 2 is a schematic cross-sectional view of a linear vibration motor according to the preferred embodiment of the present invention, FIG. 3 is a schematic exploded perspective view of the linear vibration motor shown in FIG. 2, and FIG. 4 is a schematic bottom view of a linear vibration motor shown in FIG. 2. As shown, the linear vibration motor may be configured to include a fixing part 100 and a vibrator part 200.

The fixing part 100 may be configured to include a bracket 110, a case 120, and a plurality of magnets 131 and 132 and the vibrator part 200 may be configured to include a printed circuit board 210, a coil 220, a weight body 230, an elastic member 240, a yoke 250, and a damper 260.

In more detail, the inner top surface of the bracket 110 is coupled with a first magnet 130. Preferably, the center of the bracket 110 may be coupled with the first magnet 131.

In addition, the bracket 110 is provided with a coupling part 111 coupled with the printed circuit board 210.

The coupling part 111 is provided with the protruded-shape coupling protrusion 112 to be fixedly coupled with the printed circuit board 210.

The case 120 is provided with an inner space to cover the vibrator part 200 and coupled with the top portion of the bracket 110.

In addition, the inner top surface of the case 120 is fixedly coupled with the second magnet 130 to be opposite to the first magnet 131.

The polarities of the first magnet 131 and the second magnet 132 are disposed to be opposite to each other in order to increase a magnetic force.

As an example, when a bottom portion 131a of the first magnet 131 is an S pole and a top portion 131b thereof is an N pole, a bottom portion 132b of the second magnet 132 becomes an N pole and a top portion 132a thereof becomes an S pole.

An order of polarity is not limited to the contents described in the preferred embodiment of the present invention or vice versa.

Therefore, the first magnet 131 and the second magnet 132 are spaced from each other at a predetermined distance to generate a magnetic field in a vertical direction.

The first magnet 131 and the second magnet 132 may be selectively coupled with a plate yoke 140 in order to collect the magnetic field. In the linear vibration motor of the preferred embodiment of the present invention, as shown, the top portion of the first magnet 131 is coupled with the plate yoke 140.

In addition, as shown in FIGS. 3 and 4, a bottom end of the case 120 is formed with a step 121 for drawing out the printed circuit board 210 from the inside of the case 120 to the outside and the step 121 may be provided with a fixing protrusion 122 that is fixedly coupled with the printed circuit board 210.

As described above, it may be easy to couple the printed circuit board 210 and the case 120 by fixedly coupling the printed circuit board 210 and the case 120 using the fixing protrusion 122 and it may prevent the case 120 from being separated from the printed circuit board 210 due to the external impact to improve the coupling durability of the linear vibration motor.

The printed circuit board 210 includes a coupling plate 211, an elastic part 212, and a contact part 213.

In more detail, the coupling plate 211 is formed with a coupling groove 214 corresponding to the coupling protrusion 112 provided in the coupling part 111 of the bracket 110.

Therefore, the coupling groove 214 formed on the coupling plate 211 is fixedly coupled to the coupling protrusion 112 provided in the coupling part 111 formed in the bracket 110.

The printed circuit board 210 includes the elastic part 212 that extends from the coupling plate 211 to provide an elastic force extending in a spiral direction.

Further, one end of the elastic part 212 is coupled with the bottom surface of the coil 220 of the vibrator part 200 and the coil 220 is provided with the contact part 213 to apply the external power.

Further, since the contact part 213 contacts the coil 220, it may be formed as the ring-shaped disk part corresponding to the shape of the coil 220.

Further, as shown in FIG. 2, the printed circuit board 210 extends in a spiral direction while surrounding an outer side to receive the first magnet 131 therein to be coupled with the coil 220 and the weight body 230, thereby making it possible to elastically support the vibrator part 200 from the bottom portion.

Therefore, the printed circuit board 210 may be formed in a spring shape or a coil spring shape extending in a spiral direction.

In more detail, the printed circuit board 210 includes a through hole 215 penetrating through the first and second magnets 131 and 132 so as not to contact the first magnet 131 and the second magnet 132 at the time of the vibration of the vibrator part 200, wherein the through hole 215 is formed by the elastic part 212 extending in a spiral direction so that the printed circuit board 210 includes the elastic force.

Therefore, the elastic part 212 is formed to extend in a spiral direction so that the inner diameter of the through hole 215 is formed to be larger than the outer diameter of the first and second magnets 131 and 132.

In addition, the contact part 213 that is the ring shaped disk part is also formed to have an inner diameter larger than the first and second magnets 131 and 132 so that it does not contact either the first and second magnets 131 and 132.

Therefore, the maximum vibration amount of the vibrator part 200 may be secured so as not to limit the movement displacement at the time of the linear vibration motion of the vibrator part 200 through the through hole 215 formed on the printed circuit board 210, thereby making it possible to more stably obtain the linear vibration motion.

Further, when the vibration part 200 including the coil 220 and the weight body 230 performs the linear vibration motion by the electromagnetic induction of the first and second magnets 131 and 132 and the coil 220, the printed circuit board 210 may perform the linear vibration motion in a body with the vibrator part 200.

Further, since the coupling groove 214 of the printed circuit board 210 and the coupling protrusion 112 of the bracket 110 are fixedly coupled to each other, the printed circuit board 210 is not separated even when performing the linear vibration motion in a body with the vibrator part 200.

Further, in order to improve an adhesion between the coupling plate 211 of the printed circuit board 210 and the coupling part 111 of the bracket 110, an adhesive may be applied.

Therefore, the fixing and coupling method of the printed circuit board 210 and the bracket 110 is not limited to the coupling protrusion and the coupling groove disclosed in the present invention and other units and methods for fixing the printed circuit board 210 and the bracket 110 like the bonding method of coupling the printed circuit board 210 and the bracket 110 by applying the adhesive may be used.

In addition, as shown in FIG. 4, the coupling plate 211 of the printed circuit board 210 is provided with a fixing hole 216 corresponding to the fixing protrusion 122 provided on the step 121 that is formed at the bottom end of the case 120.

In more detail, the fixing protrusion 122 of the case 120 is fixedly coupled to the fixing hole 216 of the printed circuit board 210, such that it is easy to couple the case 120 and the printed circuit board 210 and it may prevent the printed circuit board 210 that performs the linear vibration motion in a body with the vibrator part 200 from being separated from the case 120.

The coil 220 may be formed in a ring shape having a hollow part in order to generate electromagnetic force by the electromagnetic induction with the first magnet 131 and the second magnet 132.

The coil 220 is fixedly coupled with a portion surface of the contact part 213 of the printed circuit board 210 to form the magnetic field by power applied from the printed circuit board 210.

The weight body 230 is coupled with the printed circuit board 210, the coil 220, and the yoke 240. In more detail, the weight body 230 is provided with a hollow part 231 to receive the coil 220 therein.

The yoke 240 is coupled with the top portion of the weight body 230 and is press-fitted in the hollow part 231.

In addition, the weight body 230 is coupled with the top portion of the contact part 213 of the printed circuit board 210 to be linearly vibrated together with the printed circuit board 210.

The yoke 240 is coupled with the top portion of the weight body 230 in order to increase the magnetic force of the first magnet 131 and the second magnet 132 of the fixing part 100 and is provided with a receiving groove 241 to receive the coil 220 therein.

Therefore, the yoke 240 may be formed in a cylindrical yoke shape to correspond to the shape of the hollow part 231 formed in the weight body 230 and the coil 220.

In more detail, the yoke 240 is press-fitted in the hollow part 231 of the weight body 230 and the coil 220 is fixedly coupled in the receiving groove 241 of the yoke 240.

The elastic member 250 is coupled with the yoke 240 and the case 120. In more detail, one end of the elastic member 250 is fixedly coupled with the top portion 242 of the yoke 240 and spirally extends in a direction and the other end thereof is fixedly coupled with the inner top portion of the case 120 to elastically support the linear vibration motion of the vibrator part 200.

In more detail, in order to prevent the other end of the elastic member 250 from contacting with the second magnet 132 coupled with the inner top portion of the case 120 while elastically supporting the vibrator part 200, the hollow part corresponding to the second magnet 132 is formed to be inserted with the second magnet 132.

Therefore, the elastic member 250 may be formed in a spring shape or a coil spring shape that spirally extends in a direction.

The damper 260 is coupled with the printed circuit board 210 in order to prevent noise and impact when the printed circuit board 210 contacts the bracket 110 due to excessive linear vibration of the vibrator part 200.

In more detail, the damper 260 is coupled with the contact part 213 of the printed circuit board 210 to be opposite to the bracket 110 of the fixing part 100.

In addition, the hollow part 261 corresponding to the first magnet 131 is formed so that it is inserted with the first magnet 131 fixedly coupled with the top portion of the bracket 110.

As set forth above, the linear vibrator motor according to the preferred embodiment of the present invention provides the plurality of magnets to increase the electromagnetic force generated the electromagnetic induction of the magnet and the coil.

Further, the bracket includes the coupling protrusion to be coupled with the printed circuit board and the printed circuit board is provided with the coupling groove corresponding to the coupling protrusion, thereby preventing the printed circuit board from separating when the vibrator part is linearly vibrated.

In addition, the coupling groove of the printed circuit board and the coupling protrusion of the bracket can guide the assembling of the printed circuit board and the bracket during the manufacturing process.

Although the preferred embodiments of the present invention have been disclosed for illustrative purposes, they are for specifically explaining the present invention and thus the linear vibration motor according to the present invention are not limited thereto, but those skilled in the art will appreciate that various modifications, additions and substitutions are possible, without departing from the scope and spirit of the invention as disclosed in the accompanying claims.

Accordingly, such modifications, additions and substitutions should also be understood to fall within the scope of the present invention.

What is claimed is:

1. A linear vibration motor, comprising:
   a fixing part including a magnet;
   a bracket fixedly coupled with a coupling plate of a printed circuit board;
   a case formed with an inner space to cover a vibrator part and coupled with the bracket; and
   the vibrator part including a coil corresponding to the magnet and the printed circuit board coupled with the coil,
   wherein:
   one end of the printed circuit board is coupled with the fixing part and the other end thereof is coupled with the coil and is provided with a through hole through which the magnet penetrates so as not to contact the magnet
   the printed circuit board comprises the coupling plate fixedly coupled with the fixing part,
   the magnet comprises:
   a first magnet coupled with an inner top surface of the bracket; and
   a second magnet coupled with an inner top surface of the case to be opposite to the first magnet, and
   the vibrator part is provided with a through hole through which the first magnet and the second magnet penetrate so as not to contact the magnet.

2. The linear vibration motor as set forth in claim 1, wherein the printed circuit board includes:
   a coupling plate fixedly coupled with the fixing part;
   an elastic part extending from the coupling plate to provide an elastic force and extending in a spiral direction so that the through hole is formed to be larger than an outer diameter of the magnet; and a contact part provided at one end of the elastic part and coupled with the coil of the vibrator part to apply external power to the coil.

3. The linear vibration motor as set forth in claim 2, wherein the contact part is a ring-shaped disc part and an inner diameter of the contact part is formed to be larger than the outer diameter of the magnet to receive the magnet therein so as not to contact the magnet.

4. The linear vibration motor as set forth in claim 1, wherein the fixing part further includes a plate yoke that is selectively positioned at the first magnet and the second magnet.

5. The linear vibration motor as set forth in claim 1, wherein a coupling part of the bracket includes a coupling protrusion fixedly coupled with the coupling plate of the printed circuit board and the coupling plate is provided with a coupling groove corresponding to the coupling protrusion.

6. The linear vibration motor as set forth in claim 1, wherein the case includes a step for protruding the printed circuit board from the inside of the case to the outside and a fixing protrusion formed on the step and fixedly coupled with the printed circuit board and the printed circuit board is provided with a fixing hole corresponding to the fixing protrusion.

7. The linear vibration motor as set forth in claim 1, wherein the vibrator part includes:
a weight body coupled with the coil;
a cylindrical yoke coupled with the weight body to increase the magnetic force of the magnet; and
an elastic member of which one end is coupled with the top portion of the cylindrical yoke and the other end is coupled with the fixing part to elastically support the linear vibration motion of the vibrator part.

8. The linear vibration motor as set forth in claim 7, wherein the weight body is provided with a hollow part receiving the cylindrical yoke and the coil.

9. The linear vibration motor as set forth in claim 7, wherein the elastic member is provided with the hollow part corresponding to the second magnet to be inserted with the second magnet to elastically support the linear vibration motion of the vibrator part.

10. The linear vibration motor as set forth in claim 7, wherein the vibrator part further includes a damper coupled with the contact part of the printed circuit board to be opposite to the fixing part in order to prevent noise and impact when contacting with the fixing part.

11. The linear vibration motor as set forth in claim 10, wherein the damper is provided with the hollow part corresponding to the first magnet to be inserted with the first magnet according to the linear vibration motion of the vibrator part.

12. The linear vibration motor as set forth in claim 1, wherein the printed circuit board is an flexible printed circuit board made of an elastic material.

* * * * *